June 17, 1952     O. J. HAUGLAND     2,600,646

CAKE SLICER

Filed Sept. 2, 1950

Inventor.
Olaf J. Haugland
by H. J. Sanders
Attorney.

Patented June 17, 1952

2,600,646

UNITED STATES PATENT OFFICE 2,600,646

CAKE SLICER

Olaf J. Haugland, Chicago, Ill.

Application September 2, 1950, Serial No. 183,025

1 Claim. (Cl. 30—114)

This invention relates to improvements in devices for cutting, slicing or dividing food into parts for serving or eating purposes and more particularly to a cake cutter. One object is to provide a cake cutter or slicer that will cut a portion of the cake of either round or rectangular contour from the whole with one stroke and that may also be employed to remove the cut portion to a plate or like receptacle without the necessity of touching the fingers to that portion when desired.

A further object is to provide a cake cutter and/or slicer to be held by the operator in both hands so that an even cut may the more readily be had, and the desired size slice more exactly obtained, the cut portion held gently but securely against crumbling from the time it is cut until it is released from the slicer.

With the foregoing and other objects in view which will appear as the description proceeds, the invention consists of certain novel details of construction and combination of parts hereinafter more fully described and pointed out in the claims, it being understood that changes may be made without departing from the spirit of the invention as claimed.

Referring now to the drawing wherein like reference characters denote corresponding parts:

Figure 1:
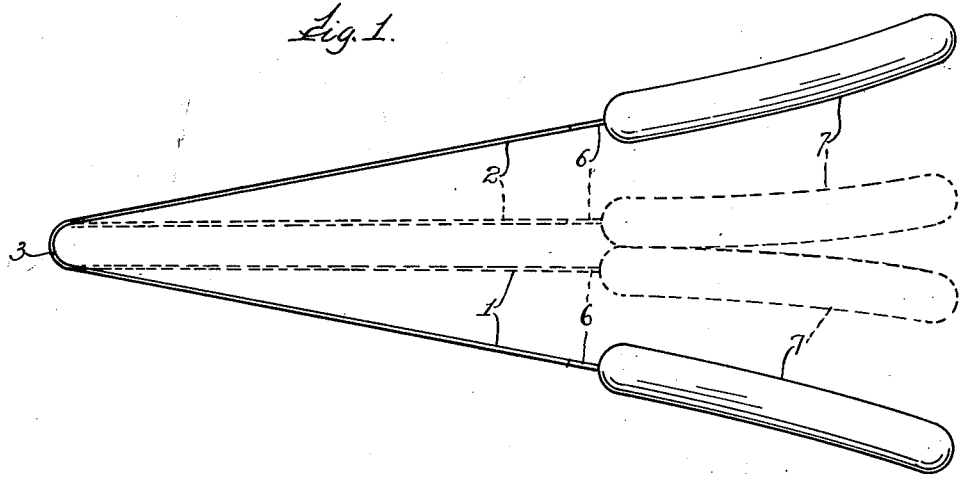
Fig. 1 is a top plan view of a cake cutter or slicer according to the instant invention, an altered position being denoted in broken lines.
Figure 2:
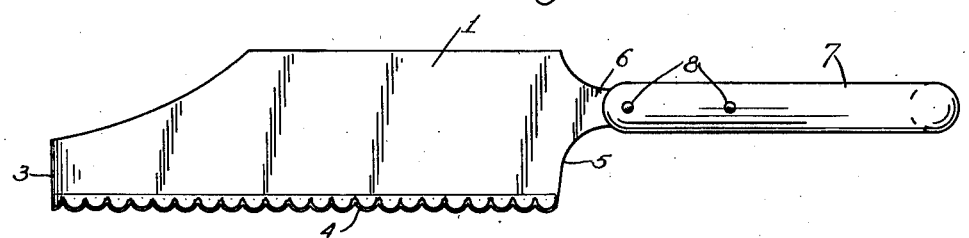
Fig. 2 is a view of the invention in side elevation.
Figure 3:
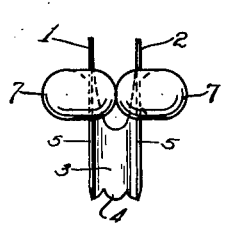
Fig. 3 is a view in end elevation, from the handle end.

The instant cutter or slicer is formed of a piece of resilient sheet of metal bent upon itself intermediate its ends to form twin blades 1, 2 connected by the forward rounded nose portion 3, the metal or other material employed is desirably thin and flat, the lower edges of both blades and of the nose portion being scalloped and sharpened to form teeth 4, both blades from the nose portion inwardly less than one-half the distance toward the blade longitudinal centers being diminished along their upper edges, the rear or heel ends 5 of both blades being reduced materially to form the rearwardly extending shanks 6 which are received in sockets formed in the elongated handles 7 and secured in position by pins or rivets 8, the handles being each of a length to be conveniently grasped one in each hand of the operator and having a slightly curved contour with their opposing convex portions facing each other.

In use the operator applies the blades to the top of the cake with the nose portion directed inwardly toward or at the center of a round cake with the blades spread apart to sever a slice of the thickness desired. A cake of rectangular contour may be readily cut in slices of predetermined thinness by placing the cutter in the position shown in dotted lines in Fig. 1. The slicer is then moved down through the cake cutting the slice which may be easily removed from the body of the cake between the blades of the slicer by gently moving same slightly toward each other after the slice has been completely cut, this is done without contacting the slice with the fingers and the slice may be deposited upon a plate or like receptacle as desired.

What is claimed is:

A cake slicer formed of a single piece of resilient material bent intermediate its ends to form elongated twin blades connected by a rounded nose portion of materially less width than said blades, said blades as they recede from said nose diverging yieldingly from each other, handles at the free ends of said blades each disposed in a line continuous with its individual blade, said handles being of twin structure and of materially greater thickness than said blades and having opposed curved faces disposed opposite each other whereby pressure at the ends thereof will cause flexing of the blades to disengage the sliced cake, said radius of the nose portion of the blade and diameter of the handles being substantially the same whereby said blades may be disposed substantially parallel for cutting cake slices of uniform thinness having parallel sides, said blades when disposed in a position diverging from one another serving to cut cake slices of wedge-like shape.

OLAF J. HAUGLAND.

REFERENCES CITED

The following references are of record in the file of this patent:

UNITED STATES PATENTS

| Number | Name | Date |
|---|---|---|
| 2,182,726 | King et al. | Dec. 5, 1939 |
| 2,264,486 | Smith et al. | Dec. 2, 1941 |